(12) United States Patent
Benjamin

(10) Patent No.: US 9,701,220 B2
(45) Date of Patent: Jul. 11, 2017

(54) SEAT HEIGHT ADJUSTMENT MODULE AND ARRANGEMENT FOR ADJUSTING THE HEIGHT OF A SEAT

(71) Applicant: GNS-KV GmbH, Bielefeld (DE)

(72) Inventor: Milto Benjamin, Guetersloh (DE)

(73) Assignee: GNS-KV GmbH, Bielefeld (DE)

( * ) Notice: Subject to any disclaimer, the term of this patent is extended or adjusted under 35 U.S.C. 154(b) by 167 days.

(21) Appl. No.: 14/621,517

(22) Filed: Feb. 13, 2015

(65) Prior Publication Data

US 2015/0231994 A1 Aug. 20, 2015

(30) Foreign Application Priority Data

Feb. 19, 2014 (DE) .................. 10 2014 102 095

(51) Int. Cl.
*B60N 2/16* (2006.01)

(52) U.S. Cl.
CPC .......... *B60N 2/1615* (2013.01); *B60N 2/165* (2013.01)

(58) Field of Classification Search
CPC ...... B60N 2/1615; B60N 2/165; B60N 2/167; B60N 2/168
See application file for complete search history.

(56) References Cited

U.S. PATENT DOCUMENTS

| 4,778,138 | A * | 10/1988 | Yamada | B60N 2/1615 248/421 |
| 6,276,650 | B1 * | 8/2001 | Kojima | B60N 2/071 248/421 |
| 6,290,198 | B1 * | 9/2001 | Kojima | B60N 2/1615 248/396 |
| 6,484,995 | B1 * | 11/2002 | Nemoto | B60N 2/1615 248/396 |
| 7,517,020 | B2 * | 4/2009 | Yokota | B60N 2/1615 248/421 |
| 7,828,384 | B2 * | 11/2010 | Shinozaki | B60N 2/1615 297/344.14 |
| 8,496,098 | B1 * | 7/2013 | Napau | B60N 2/165 192/15 |
| 2004/0099498 | A1 * | 5/2004 | Kurita | B60N 2/1615 192/12 B |
| 2007/0108826 | A1 * | 5/2007 | Kojima | B60N 2/1615 297/374 |
| 2007/0137965 | A1 * | 6/2007 | Yamada | B60N 2/1615 192/19 |
| 2009/0127907 | A1 * | 5/2009 | Hoshi | B60N 2/1615 297/344.12 |
| 2012/0049598 | A1 * | 3/2012 | Fujihara | B60N 2/1615 297/338 |

(Continued)

*Primary Examiner* — Timothy J Brindley
(74) *Attorney, Agent, or Firm* — Stephan A. Pendorf; Patent Central LLC

(57) ABSTRACT

A seat height adjustment module for a seat, in particular for a vehicle seat, having a manually operable control element which, to provide an adjusting movement for the seat, can be moved out of an initial position into a first actuating position and into a second actuating position and back. A primary spring is provided, which cooperates with a transmission member such that the primary spring is relaxed with movement of the control element into a first actuating position and such that the primary spring is tensioned with movement of a control element into the second actuating position.

17 Claims, 6 Drawing Sheets

(56) References Cited

U.S. PATENT DOCUMENTS

Figure 1:
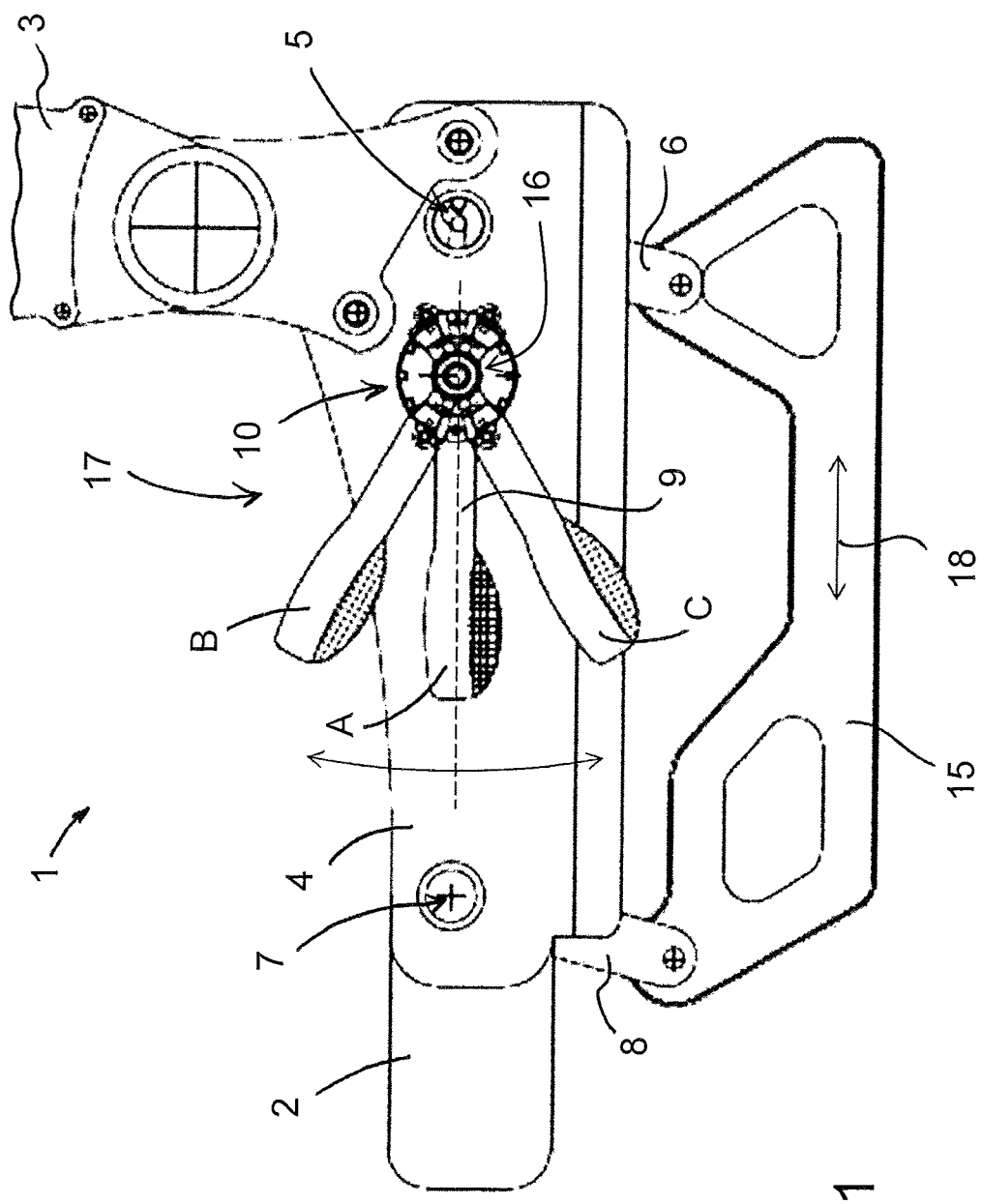

| | | | |
|---|---|---|---|
| 2012/0305359 A1* | 12/2012 | Sato | B60N 2/1615 192/45.001 |
| 2014/0224553 A1* | 8/2014 | Ozawa | B60N 2/002 177/136 |
| 2015/0076310 A1* | 3/2015 | Yamada | B60N 2/1615 248/421 |
| 2015/0210188 A1* | 7/2015 | Hoshi | B60N 2/68 297/344.12 |
| 2015/0231993 A1* | 8/2015 | Hoshi | B60N 2/1615 297/344.12 |
| 2015/0266397 A1* | 9/2015 | Benjamin | B60N 2/168 192/15 |
| 2015/0306983 A1* | 10/2015 | Takei | B60N 2/6009 297/183.9 |
| 2016/0229315 A1* | 8/2016 | Yamada | B60N 2/1615 |

* cited by examiner

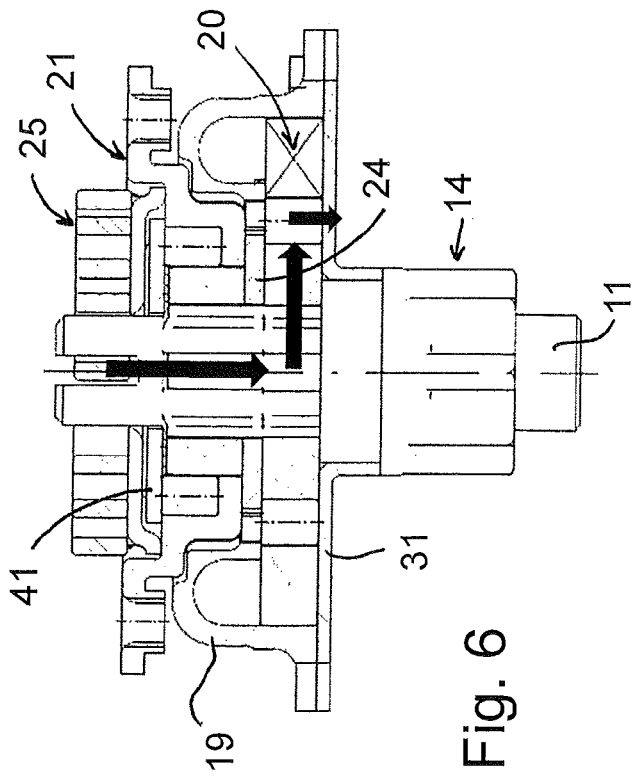
Fig. 6
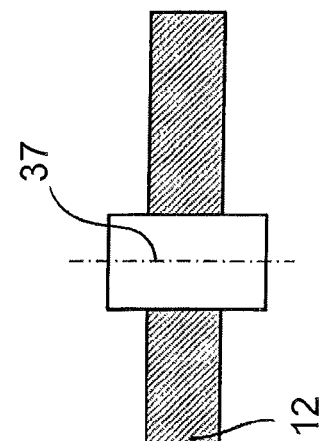
Fig. 7
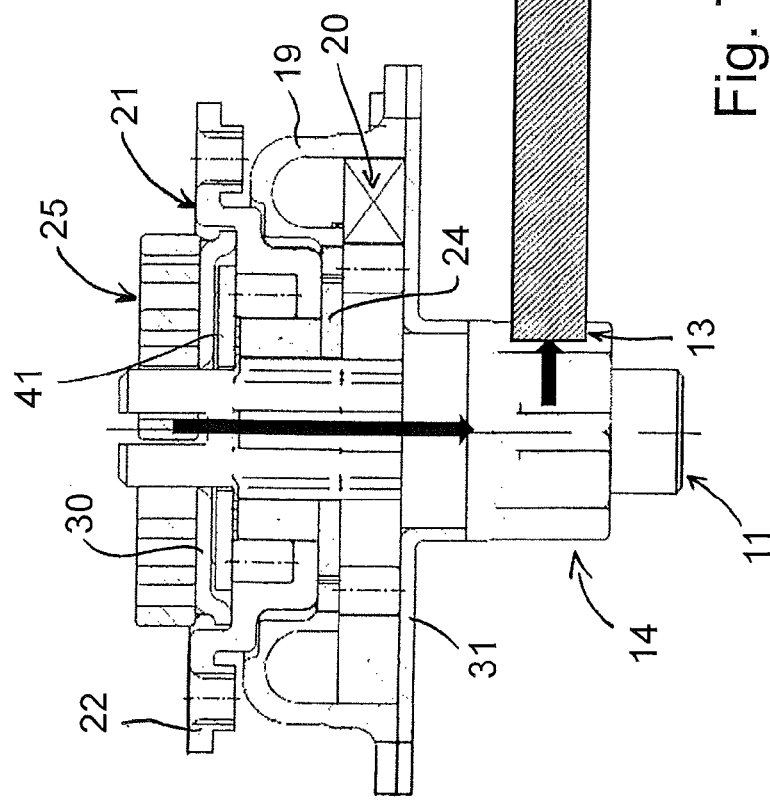

SEAT HEIGHT ADJUSTMENT MODULE AND ARRANGEMENT FOR ADJUSTING THE HEIGHT OF A SEAT

The invention relates to a seat height adjustment module for a seat, in particular for a vehicle seat, having a manually operable control element, which, to allow an adjusting movement for the seat, can be moved out of an initial basic position into a first actuating position and into a second actuating position and back, with a transmission member, which is adapted to transfer the adjusting movement to a connection linkage or kinematic, and having a converter device, which cooperates with the control element on the one hand and with the transmission member on the other hand in such a way, that the transmission member is blocked as long as the control element is in the initial position or if the control element is being moved from the first actuation position or the second actuation position back into the initial position, and that the adjusting movement is transmitted from the control element to the transmission element when the control element is being moved from the initial position into the first actuating position or the second actuating position.

Furthermore, the invention concerns an arrangement for adjustment of the height of a seat.

Manual seat height adjustment modules are used in vehicles to lift a seat, for example, to raise or lower the driver's seat of a vehicle from a standard position. The height adjustment is used in particular to ensure ease of use of the vehicle for people of different sizes. Usually, the seat height adjustment is realized via a pivoting movement of the seat. For this purpose, the seat is held by a plurality of pivot levers which are on the one hand pivotally mounted on the seat and on the other hand pivotally mounted on a base support on which the seat is supported. As a result of the pivoting movement, the seat is raised and at the same time moved in the direction of the vehicle longitudinal axis as a function of the orientation of the pivot levers. To compensate for the shift in the vehicle longitudinal axis, the seat height adjustment is superimposed commonly with a means to shift the seat in the vehicle longitudinal direction.

The manual seat height adjustment is generally provided with a control element, which is manually operated. To simplify the operation and to provide reasonable ease, the manual actuation movement is usually implemented by translating small forces or moments over comparatively large paths or angles into large forces or moments and with small paths or angles. The comparatively large paths or angles during the manual operation of the adjustment module are introduced, for example, via a control wheel, or are broken down into smaller partial operation means through the provision of a pumping mechanism. In particular, a manual actuation lever is provided, which can be pivoted from a initial position into a first actuating position for raising the seat. From the first actuating position the hand lever return to the initial position, for example, under spring force, wherein a freewheeling ensures that the seat remains in the raised position. By repeated movement of the manual operating lever from the initial position into the first actuating position the seat is raised further. The seat can thus be raised, actuating stroke by actuating stroke, into a topmost seat position. In an analogous manner, the seat can be lowered by pivoting the manual operating lever from the initial position to a second actuating position. A typical ratio between the manual actuation lever on the one hand and the pivotal movement of the seat on the other hand is in the range of 1:5 to 1:8 and preferably in the range from 1:6 to 1:7. The primary side actuation torque needed to be applied via the pivot lever is therefore about five to eight times lower than the adjusting moment that is applied to the seat on the secondary side for the realization of seat height adjustment.

In today's systems often a second means is provided in order to keep the operating forces to be applied by the hand as low as possible. For this, a biased torsion spring is provided integrated in the seat on the secondary side, which can be provided pretensioned between the seat or a seat carrying component of the one hand and the pivot lever or a thereto permanently connected component on the other hand. The torsion spring is usually realized in the manner of a twisted torsion bar extending transverse across the seat. The torsion spring is generally dimensioned such that the weight of a standard person of about 75 kg is compensated or balance by the pretension or bias of the torsion spring. The spring is thus pretensioned with about 750 N. In this respect, the adjusting torque when lifting of the seat is reduced according to the bias of the torsion spring, while during the lowering of the seat the renewed retensioning of the torsion spring supports the weight of the person on the seat. The thus created seat height adjustment assembly has a variety of interfaces to related functional components. The vehicle integration is therefore relatively expensive. In addition, the biasing of a torsion spring to 750 N is laborious.

The object of the present invention is thus to design a compact as possible seat height adjustment module and to provide an arrangement for adjusting the height of the seat which is inexpensive to produce and easy to manufacture and easy to manipulate.

To achieve the object, the invention is characterized, in combination with the preamble of claim 1, in that there is at least one primary spring, which cooperates with the transmission member in such a manner that the primary spring relaxes during the movement of the control element into the first actuating position and that the primary spring is retensioned during movement of the control element into the second actuating position.

The particular advantage of the invention is that the provision of a primary spring cooperating with a transmission member, the spring pretensioning can be significantly reduced. Since the transmission element is provided on the primary side as part of the seat height adjustment module, i.e., before the transmission interface to the components of the connection linkage or kinematic, the tensioning or bias to be provided by the spring can be reduced by a factor of 4 to 9, preferably by a factor of 5 to 8 and particularly preferably by a factor of 6 to 7, compared to today's conventional spring tension or bias of the built-in seat torsion spring. Accordingly, the manufacture process is simplified, since the spring can be mounted much more easily due to the much lower bias tension.

For the purposes of the invention, the bias of a spring always refers to the specific application. Torsion bars or torsion springs used today are provided on the secondary side and dimensioned so that they compensate for the weight of a standard passenger sitting on the seat to be operated. If one presumes a standard weight of 75 kg, the springs in use today on the secondary side of the arrangement for height adjustment of the seat are pretensioned at 75 kg or about 750 N. The spring is in this case provided such that it is biased during the lowering of the seat and stores energy, and so that during the lifting of the seat it releases the stored energy and assists in the operation. If one designs the spring as the primary spring according to the invention, that is, one sees the spring on the primary side of the assembly before the gear ratio between the primary side and the secondary side, there results in a reduction of the bias pretension. For example, if a ratio of 1:5 is realized, a spring provided on the primary side must be biased with 15 kg and 150 N to equalize the standard weight of 75 kg.

The seat height adjustment module is realized for example as compact unit. It has, in addition to the transmission member, which is formed as an interface component to the secondary-side terminal kinematics and serves to transfer the displacement movement to the connection kinematics, and in particular the manual control element as well as the converter means, which is provided for transmitting the adjusting movement provided via the control element to the transmission member. The control element is formed, for example, as a hand lever. The transmission means can also include a per se known brake unit, for setting the transmission member, and an actuating unit, which depending on the type of operation either transmits the actuating movement manually introduced by the manual operating lever or serves as a freewheel and allows the return of the manual operating lever. It is conventional, for example, to design the control element for movement out of the initial position by rotating in a first rotational direction, for example by turning clockwise, to move it into a first actuating position, to raise the vehicle seat, and to move the control element from the starting position by turning in a second rotational direction, for example, by rotation to in the counterclockwise direction, to bring it into the second operation position, to lower the vehicle seat. A rotational movement of, for example, +/−30 degrees from the normal position is preferred for this.

In order to penult actuation of the control element in the first rotational direction and in the second rotational direction, the brake unit of the converter device is typically implemented as a double-acting brake. Likewise, the operating unit of the converter device acts as a two direction freewheel. There can be provided for the brake and the freewheel respectively an enabling element which allows the release of the brake or the setting of the operating unit. For example, the brake can be realized in the manner of a wrap spring brake. The provision of the control element from the first actuation position to the initial position or from the second actuating position into the initial position can be effected for example via a return spring. Preferably, the setting or securing of the transmission element occurs positively or non-positively, for example, by blocking the transmission element.

Optionally, instead of a single primary spring, a plurality of primary springs can be provided. A pretension of the primary springs is chosen so that all primary springs collectively support the seat height adjustment operation. Since each individual spring can be dimensioned smaller or less biased, the assembly is simplified. In addition, the primary springs can be distributed so that the integration can be flexibly designed in terms of the available space.

According to a preferred embodiment of the invention, the primary spring is pretensioned in the second actuating position with a maximum of 200 N, preferably 150 N or less. Providing a pretension of a maximum of 200 N in the second actuating position corresponds, assuming a conversion ratio in the region of the connection kinematics of 1:4 to 1:9, to a conventional customary pretension of the torsion spring on the secondary side of 1000 N or more. Accordingly, current systems can be designed to utilize a biasing spring with less than 200 N. In particular, the spring bias is at a maximum in the lower seat position, since the control element is repeatedly moved out of the initial position, preferably until reaching a mechanical stop, to the second actuating position. The primary spring is thus repeatedly pretensioned, wherein due to the blockade of the transfer element during the movement of the control element out of the second actuating position into the initial position the preload in the remains.

According to another embodiment, the primary spring is in the form of a coil spring. Advantageously the spiral spring provides a particularly compact design, which is suitable to be implemented as part of a likewise compactly constructed seat height adjustment module. The coil spring here has a relatively large displacement travel, which is in principle necessary due to the low pretension and the provision of the primary spring directly on the transmission member.

For example, a first terminal portion or connection portion of the primary spring can be directly fixed to the transmission member. The transmission member may be provided for this purpose with a recess which receives the first connection portion of the primary spring. For example, a second connection portion of the primary spring may be fixed to the housing of the transmission member, on the seat itself, or on a component connected to the seat support. For example, the primary spring can be supported on the seat shell. Therewith there results the possibility, by the relative motion between the control element connected to the transmission member and the housing fixed to the seat or the seat itself, to pretension the spring or to relax this during the raising of the seat.

According to another embodiment, the transmission element is in the form of a shaft carrying a pinion. For receiving said first terminal portion of the primary spring, an end face of the shaft may be provided with a groove as a receptacle. Advantageously, by means of a shaft, the manual adjustment input via the control element can be transmitted in a very simple way to the connection kinematics. In particular, the shaft can be provided coaxially to the rotational axis of actuation of the control element. Thereby there results in a very compact design, which allows a total space-saving design and is advantageous in terms of forces to be supported.

To achieve the invention, there is provided an arrangement for height adjustment of the seat includes a seat height adjustment module according to one of claims 1 to 6 as well as the kinematic connection with a first pivot lever and a second pivoting lever. The first pivot lever is rotatably supported in a bearing point on the one hand and on the seat on the other hand. Furthermore, the first pivot lever is connected fixed against rotation with a connecting member, which cooperates with the transmission member of the seat height adjustment module for transmission of the adjusting motion to the seat. For example, the connection member is designed in the manner of a toothed rocker arm, whereby gears provided on the connecting member engage or mesh with teeth with the pinion of the transmitting member The seat height adjustment module is associated with a primary side of the assembly, the connection kinematics with a secondary side. Between the primary and the secondary side a conversion in the range from 1:4 to 1:9 is realized, whereby small forces or moments and long travel ranges or displacement are transmitted in large forces or moments and small adjustment paths or small adjustment angles.

The particular advantage of the invention is comprised therein, that means for adjusting the height of the seat with respect to the kinematic components that has been tried and tested for many years continues to be used. However, it is inventive in the field of seat height adjustment modules— that is, on the primary side—a primary spring is provided to support the adjustment. Since the primary spring is provided on the primary side of the arrangement and since between the primary side and the secondary side a transmission ratio of 1:4 to 1:9, preferably a ratio of 1:5 to 1:8 and more preferably a ratio of 1:6 to 1:7 is realized, the primary spring may have less bias or pretension than the range of kinematic connection provided the modern conventional secondary spring—that is, the secondary side. Accordingly, the assembly is simplified. In addition, the secondary spring can be dispensed with. This results in an easier integration of the assembly into the seat.

According to a further development of the invention a secondary spring, preferably a torsion spring, may additionally be provided which is associated with the secondary side and cooperates with the connection kinematics such that the secondary spring, during movement of the control element into the first actuating position, is relaxed and that the secondary spring, during movement of the control element into the second actuating position, is tensioned. Advantageously, by the provision of a prestressed primary spring and by the simultaneous provision of a prestressed or pretensioned secondary spring, each individual spring can be designed to be smaller. Each spring can therefore be provided with a lower bias or pretension, which is especially advantageous with regard to installation. In addition, the space requirement is reduced since the lowering of the pretension with the same adjustment paths or strokes, each spring can be made more compact. A ratio of the bias of the primary spring to the bias of the secondary spring, in the first actuation position or the second actuation position of the control element or in the initial position of the control element, is in the range 0.25 to 4, preferably in the range of 0.5 to 2.

Additional advantages, features and details of the invention can be seen from the other dependent claims and the following description. There mentioned features can be used individually independently or in any combination, respectively. Features and details of the inventive described seat height adjustment module are applicable also in connection with the present arrangement for height adjustment of the seat and vice versa. Thus with respect to the disclosure of the individual aspects of the invention cross reference may be made. The drawings are only an example to clarify the invention and not restrictive.

Figure 2:
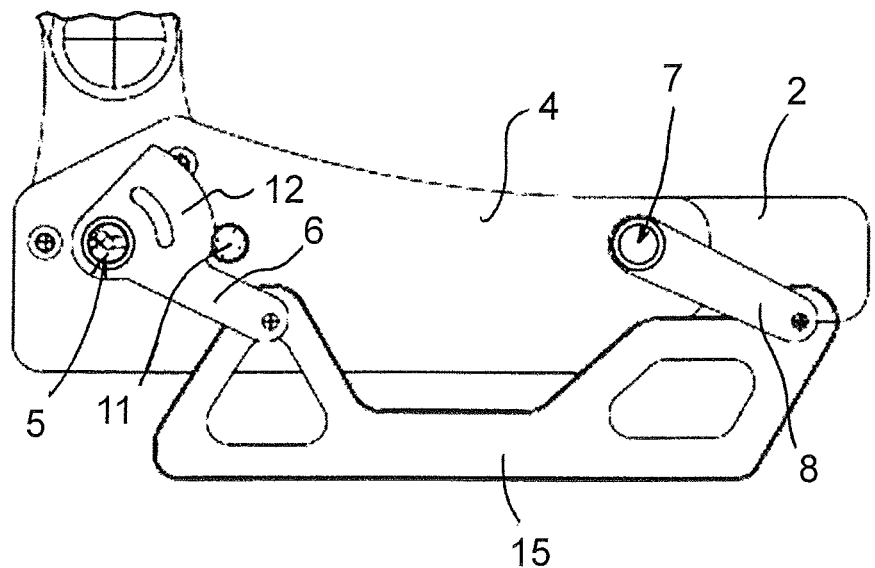
Figure 3:
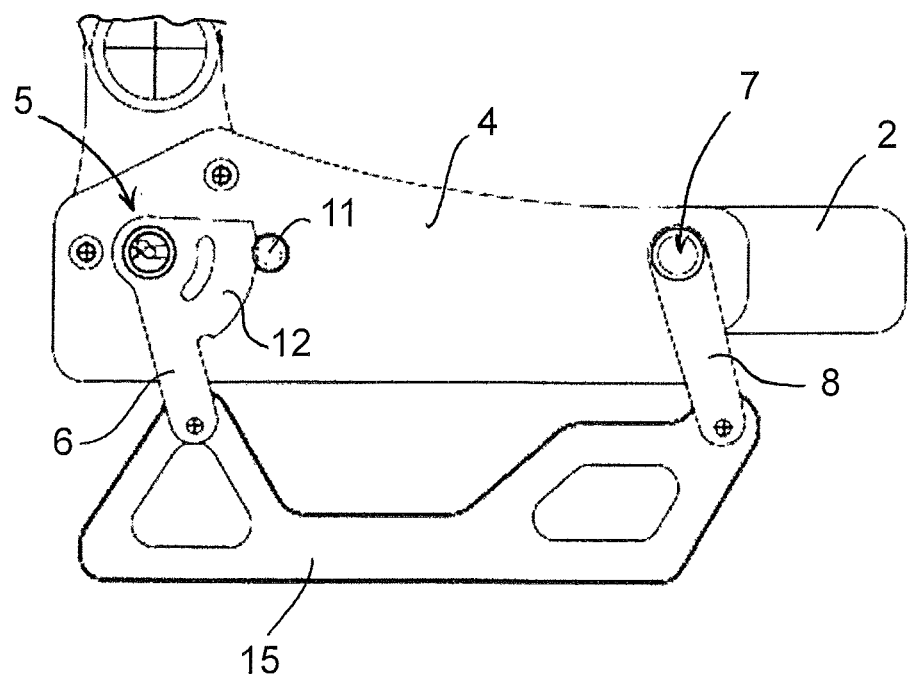
Figure 4:
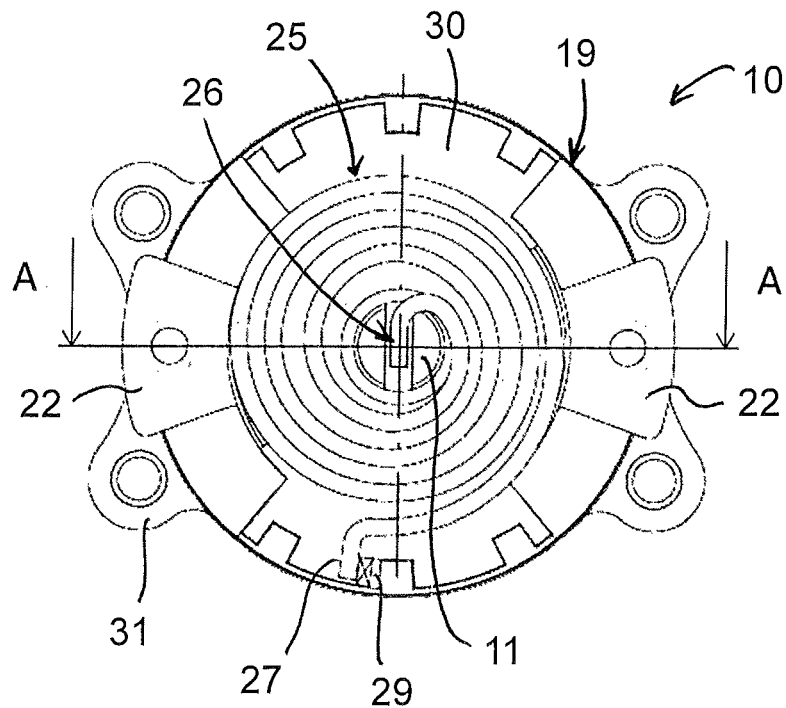
Figure 5:
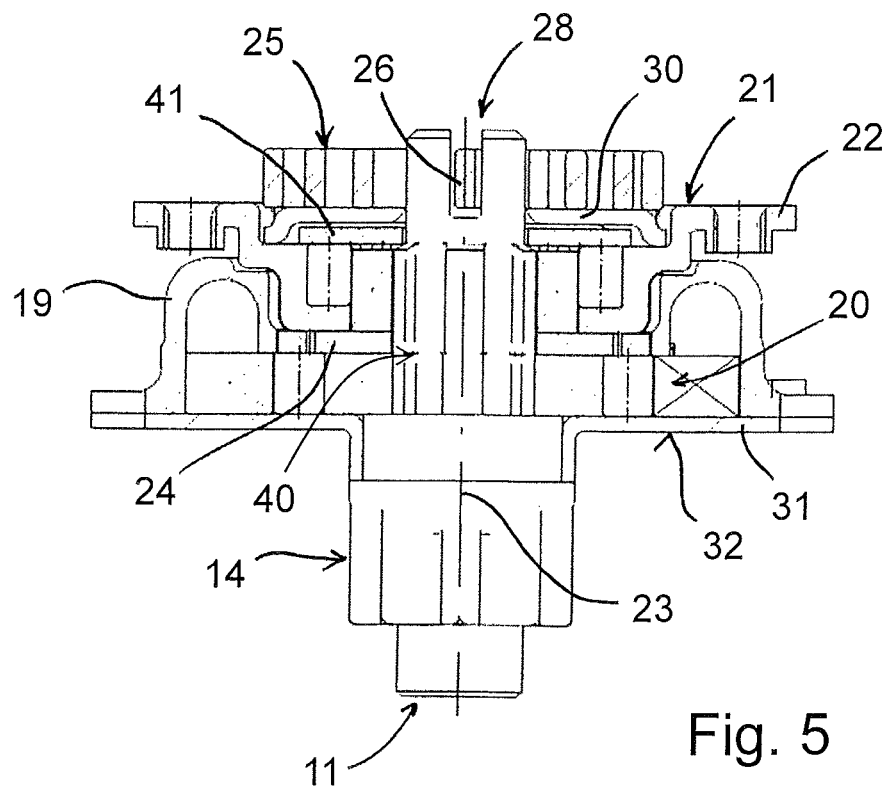
Figure 8:
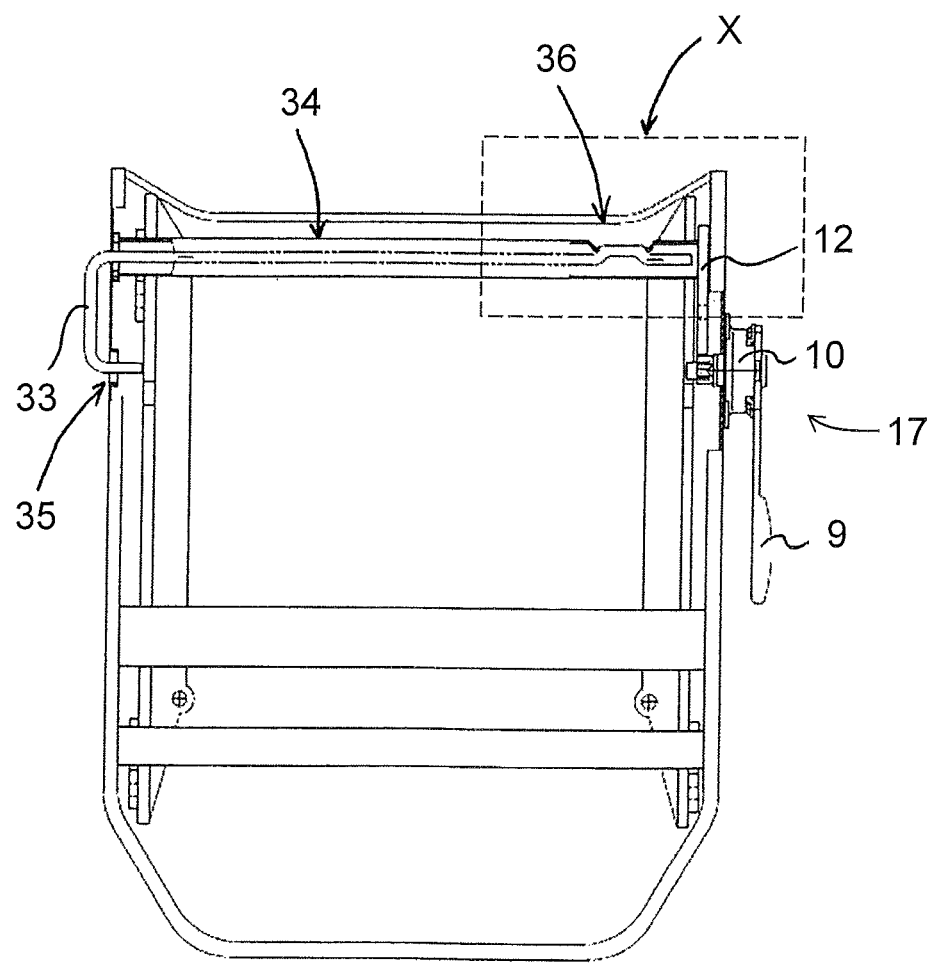
Figure 9:
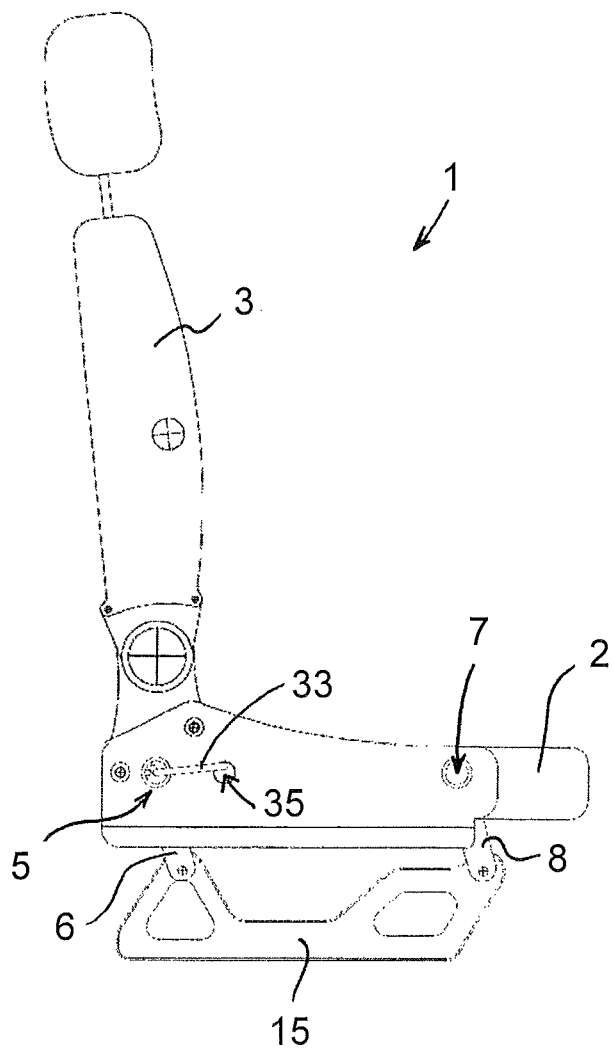
Figure 10:
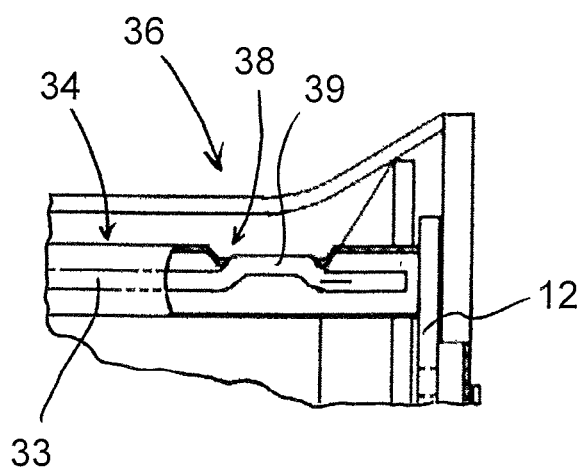

In the drawings:

FIG. 1 shows a side view of a vehicle equipped with a seat height adjustment module according to the invention, FIG. 2 shows the kinematic connection situation at the seat in a first seat position, FIG. 3 shows the kinematics of the seat according to FIG. 2 in a second seat position, FIG. 4 is a plan view of an inventive seat height adjustment module, FIG. 5 is a sectional view of the seat height adjustment module of FIG. 4 through the section AA, FIG. 6 shows the sectional view of the seat height adjustment module of FIG. 5 with the power flow in a non-operating situation, FIG. 7 shows the power flow in the seat height adjustment module and a therewith cooperating tooth rocker in an operating situation, FIG. 8 shows the arrangement for adjusting the height of the seat with a seat height adjustment module and a secondary spring of the invention, FIG. 9 shows an installed situation of the secondary spring according to FIG. 8 in a side view and FIG. 10 shows an enlarged detail of the region X of FIG. 8.

A vehicle seat 1 with an arrangement for vertical adjustment of the seat 1 according to FIGS. 1 to 3 includes a seat 2, a backrest 3 preferably rotatably supported with respect to the seat 2, a support component 4 associated with the sides of the seat 2 and supporting it, a first pivot lever 6 supported rotatably about a first pivot point 5 on the support component 4 and a second pivot lever 8 supported rotatably about a second pivot point 7. The first pivot lever 6 and the second pivot lever 8 are each rotatably supported on a longitudinal support 15. The longitudinal support 15 may in particular be mounted longitudinally displaceably in a longitudinal direction of displacement 18 in the vehicle. Furthermore, there are provided: a control element 9 laterally associated with the seat 1 or more particularly the support component 4, which is designed in the manner of a manual operating lever 9, a converter device 10, a transmission member 11 which is formed in the manner of a pinion 14 having shaft 11, and a connecting element 12, which is rotationally fixedly connected to the first pivot lever 6 and is rotatably supported together with the latter with respect to the first pivot point 5. The connecting member 12 is formed in the manner of a toothed rocker arm 12, wherein the toothed rocker arm 12 has teeth 13 which mesh with the pinion 14.

The manual operating lever 9 can be pivoted from an initial position A into a first actuating position B. To this end, the control element 9, which is rotatably supported in relation to an actuation pivot point 16, is rotated clockwise. In the same way, the control element 9 may be pivoted in the counterclockwise direction and brought into a second actuating position C. In each case an adjusting movement provided by the pivoting of the operating lever 9 is transferred to the transmission member 11 via the converter device 10. As a result of the actuation of the control element 9, the seat 2 is raised relative to longitudinal support 15 when the manual operating lever 9 is brought in the first actuating position B, or lowered, when the manual operating lever 9 is brought in the second actuating position C. The adjusting movement is transferred from the pinion 14 of the transmission member 11 to the rocker gear 12 and the therewith non-rotatably connected first pivot lever 6. The toothed rocker 12 is pivoted together with the first pivot lever 6 relatively to the first pivot point 5, so that the seat 2 is raised or lowered depending on the direction of the adjusting movement. A lower seat position of the seat 1 is shown in FIG. 2. A raised seat position of the seat 1 is shown in FIG. 3. In each case the lower seat position and the raised seat position is delineated by a not-shown stop, which prevents the seat 2 from being further raised or lowered upon actuation of the control element 9.

The control element 9, the converter device 10 and the transmission member 11 are part of a seat height adjustment module s 17, which is implemented as a common structural unit, and is attached to the support component 4 of the seat 1. The first pivot lever 6 with the toothed rocker arm 12, the second pivot lever 8, the support component 4 carrying the seat 2 and the longitudinal member 15 belong to a connection kinematics of the seat 1. The seat height adjustment module 17 and the connection kinematics on the transmission member 11 and the terminal member 12 are kinematicaly connected. The translation ratio is approximately 1:6 between the transmission member 11 and the connecting member 12, wherein the seat height adjustment module 17 is associated with a primary side and the connection kinematics is associated with a secondary side of the arrangement, and wherein small forces or small moments and large displacement paths or adjustment angles on the primary side are converted to large forces or moments and small displacement paths or adjustment angles on the secondary side. In principle, depending on the specific design boundary conditions and the required supporting effect of seat height adjustment, other ratios between the primary side and the secondary side can be realized. Advantageous are translations in the range from 1:4 to 1:9.

As shown in FIGS. 4 and 5 the converter device 10 includes a housing 19, a braking unit 20 located in the housing 19 and connected with free play via a spline shaft section 40 to the transmission member 11 as well as an operation unit 21 which is connected via two mounting elements 22 with the not shown control element 9 and is also fixed via the splined portion 40 with play to the transmission member 11. The brake unit 20 is so configured in the manner of a double-acting brake that the transmission member 11 can be blocked. The transmission member 11 may then not perform a rotary movement about the actuation axis of rotation 23. The actuation axis of rotation 23 passes through the actuating pivot point 16 of the control element 9. The rotation of the transmission member 11 can thus be blocked independently of the direction of rotation via the brake unit 20. In addition, means 24 are provided for releasing the brake unit 20. The brake unit 20 can be operated as required, that is, placed in a blocking position or into a release position. In particular, the release means 24 for the brake unit 20 are designed as part of the actuator unit 21. As an example of the release means 24, a guide ring or mouth ring 24 is provided which engages in the recess of the braking unit 20 and blocks or, as the case may be, releases this, depending on the direction of rotation and on the load.

The actuator unit 21 is implemented as two side acting freewheel. The actuator unit 21 is designed so that an adjusting movement is transmitted by means of the actuator unit 21, provided that the control element 9 is moved from the initial position A in the first actuating position B or to the second actuating position C. A return movement of the operating member 9 from the first actuating position B to the initial position A or from the second actuating position C to the initial position A in contrast is not transmitted. In particular, the return movement is effected by means of not shown return springs, which are tensioned on the movement of the control element 9 from the initial position A into the first actuating position B or into the second actuating position C and relaxed with the return movement. The actuator 21 is also associated with a release means 41, which unlocks the freewheel as needed, that is, is in particular dependent on the direction of motion and the direction of action of the forces. The release means of the actuator unit 41 may also be constructed in the manner of a claw ring 41.

Further, a primary spring 25 is provided on the primary side as part of the seat height adjustment module 17. The primary spring 25 is designed in the manner of a helical spring 25. It comprises a first connection portion 26 and a second connection portion 27. The first connection portion 26 is fixed in a groove-shaped recess 28 which is formed on the shaft 11. The second connection portion 27 is supported on a bearing surface 29 of the housing 19. In the illustrated case, the primary spring 25 is applied directly to a closure plate 30 of the housing 19 of the converter device 10. The groove-shaped recess 28 is realized in the transmission element 11 on an opposite side of the converter device 10 referenced on the pinion 14. The pinion 14 is supported on a bearing plate 31 of the housing 19. The bearing plate 31 has a flat bearing surface 32 which is intended to bear against the flat shaped support component 4 of the seat 1.

The flow of force in the seat height adjustment module 17 is shown in FIGS. 6 and 7. FIG. 6 shows first a static blocking situation of the seat height adjustment module 17. A pretensioned biasing force of the primary spring 25 is here supported on the transmission member 11 and from there transmitted via the transmission member 11 to the blocking brake unit 20 on the thrust disk 31. The thrust disk 31 is itself then supported on the support component 4 of the seat 1.

In the case that an adjusting movement for lifting of the seat 1, or for the lowering of the same, is provided via the control element 9, the braking unit 20 releases the transmission member 11. The primary spring 25 then acts on the on the toothed rocker arm 12 via the transmission member 11 and the pinion 14, which is rotatably supported with respect to the seat 1 in the first pivot point 5. The bias of the primary spring 25 is designed so that the primary spring 25 is relaxed when lifting the seat 1 and the primary spring 25 is tensioned when lowering the seat 1. In the dynamic operating state of FIG. 7, the actuating force introduced via the operating member 9 is superimposed on the spring pre-load. If the control element 9 is moved from the initial position A into the first actuating position B, the seat 2 lifts. In this case, the primary spring 25 supports the adjustment. If the seat 1 is lowered, the control element 9 is moved from the initial position A into the second actuating position C. In this operating condition, the primary spring 25 acts against the adjusting movement. In this respect, the spring 25 is tensioned, to the extent that the seat 1 is lowered.

The bias of the primary spring 25 is selected such that on the secondary side a force of approximately 750 N and 75 kg is provided. In this respect, the primary spring 25 serves to ensure that static weight of a standard person sitting on the seat 1 is compensated. When lifting the seat 1 therefore the control element 9 need only introduce the difference between the standard weight and the actual weight as well as the static and dynamic forces in the system. On the other hand, the weight of the user supports the downward movement of the seat 1. Here it is so that the weight of the user serves to tension the primary spring 25 when lowering the seat 1. The user only has to apply a differential force via the control element 9.

FIG. 7 in particular shows that due to the geometry of the pinion 14 and the toothed rocker 12 a translation of approximately 1:6 is realized. The translation is configured such that on the primary side defined by the seat height adjustment module 17 for small actuating forces a large adjusting movement is provided. In contrast, on the secondary side defined by the connection kinematics or the toothed rocker 12, small adjustment travel or angles of rotation cause large forces or moments.

As a result of a translation of approximately 1:6, the primary spring 25 must be provided with a pretension of approximately 12 kg to 13 kg to support a standard weight of about 75 kg. Consequently, as a result of the translation, the primary spring 25 can be pretensioned a comparatively small amount with about 120 N to 130 N. In contrast, a spring which is on the secondary side would have to be provided with a pretension of about 750 N in order to provide the same support effect in the operation of the seat height adjustment module 17.

Optionally, in combination with the primary spring 25 a secondary spring 33 may be provided on the secondary side. FIGS. 8 to 10 show a corresponding arrangement for height adjustment of the seat 1, in which an inventive seat height adjustment module 17 are realized with a primary spring 25 and secondary spring 33 acting on the secondary side, not shown.

The secondary spring 33 is in this case designed in the manner of a torsion spring or torsion bar 33. It lies extending in direction transverse to the longitudinal displacement 18 in a transverse tube 34 and is supported on a first contact point 35 on the seat 1 and a second contact point 36 on the transverse tube 34. The cross tube 34 is here rotationally fixedly connected to the rocker gear 12 or with the first pivot lever 6 and is provided coaxially to an axis of rotation 37 which extends through the first pivot point 5. The axis of rotation extending through the first pivot point 5 may be provided in parallel to the actuator axis of rotation of the control element 9 or, as the case may be, the transmission member 11. The second bearing point 36 is formed by a recess 38 on the cross tube 34, and a bent portion 39 formed on the secondary spring 33, which engages in the recess 38 and is supported on this. The secondary spring 33 can support the primary spring 25 and can relax during the lifting of the seat 1 and can be tensioned during a lowering the seat 1.

In each case, the primary spring 25 or as the case may be the secondary spring 33 can remain partially relaxed in the upper seat position according to FIG. 2 so that a residual partial pretensioning remains.

According to an alternative, not shown, embodiment of the invention the primary spring 25 may be provided spatially separated from the converter device 10. For example, the primary spring 25 may be on the primary side of the array associated with an additional gear wheel which meshes with pinion 14, which gear wheel is provided adjacent to the pinion 14. It is a characteristic of the invention that that the primary spring 25 is provided pretensioned on the primary side of the array as part of the seat height adjustment module 17. A torsion spring 33 on the secondary side is merely optional.

The provision of the coil spring 25 is merely exemplary. For example, the primary spring 25 can be realized in the manner of a torsion spring or torsion bar.

According to an alternative embodiment of the invention, the second pivot lever 8 can be dispensed with. The arrangement according to the invention could then be used to implement a tilt adjustment for the seat, in which case for example, the seat 1 or a portion of the seat 1, in particular a part of the seat surface 2, is pivoted relative to the horizontal.

The same components and component features are designated by like reference numerals.

The invention claimed is:

1. A seat height adjustment module (17) for a seat (1), with
 a manually operable control element (9) which is moveable out of an initial position (A) into a first actuating position (B) and into a second actuating position (C) and back and forth about an axis of rotation (23) to provide an adjusting movement for the seat (1),
 a transmission member (11) having an axis of rotation (23) coaxial with the control element axis of rotation (23), which transmission member (11) is adapted to transmit the adjusting movement from the control element (9) to a connection kinematics, and
 a converter device (10), which is in cooperative association with the control element (9) and with the transmission member (11) in such a way, that the transmission member (11) is fixed when the control element (9) is in the initial position (A) or when the control element (9) is being returned from the first actuating position (B) or from the second actuating position (C) back into the initial position (A), and that the adjusting movement of the control element (9) is transmitted onto the transmission member (11) when the control element (9) is being moved out of the initial position (A) and into the first actuating position (B) or the second actuation position (C),
 wherein at least one primary spring (25) having an axis is provided, which is in cooperative association with the transmission member (11) in such a way that the primary spring (25) progressively relaxes during each movement of the control element (9) into the first actuating position (B) and the primary spring (25) progressively tensions during each movement of the control element (9) into the second actuating position (C), and
 wherein the primary spring (25) axis is coaxial with the control element (9) axis of rotation (23) and the transmission member (11) axis of rotation (23).

2. The seat height adjustment module (17) according to claim 1, wherein the primary spring (25) in the second actuating position (C) is pretensioned with a maximum of 200 N.

3. The seat height adjustment module (17) according to claim 1, wherein the primary spring (25) is a coil spring.

4. The seat height adjustment module (17) according to claim 1, wherein a first connection portion (26) of the primary spring (25) is form-fittingly and/or frictionally secured directly to the transmission member (11) and/or that of the transmission member (11) is provided with a recess (28) for receiving a first connection portion (26) of the primary spring (25).

5. The seat height adjustment module (17) according to claim 1, wherein a second connection portion (27) of the primary spring (25) is secured to the converter device (10), to a partially enclosing housing thereof, or to the seat (1) or a supporting component (4) connected to the seat (1).

6. The seat height adjustment module (17) according to claim 1, wherein the transmission member (11) is a pinion (14) carrying shaft (11) and/or the shaft (11) is provided with a groove-shaped recess (28) at an end as a receptacle for a first connecting portion (26) of the primary spring (25).

7. An arrangement for adjusting the height of a seat (1), in particular a vehicle seat (1), comprising:
 a seat height adjustment module (17) according to claim 1, wherein the seat height adjustment module (17) is associated with a primary side of the assembly;
 connecting kinematics having a first pivot lever (6) which is rotatably supported in a bearing point and on the seat (1) and is rotationally fixedly connected with a connection member (12), wherein the connection member (12) is cooperatively associated with the transmission member (11) of the seat height adjustment module (17) for transferring the adjusting movement to the seat (1) and wherein the connection kinematics is associated with a secondary side of the arrangement,
 wherein between the primary side and the secondary side of the arrangement a translation in the range of from 1:4 to 1:9 is provided.

8. The arrangement according to claim 7, wherein a secondary spring (33) is provided, which is assigned to the secondary side and which cooperates with the connection kinematics such that the secondary spring (33) is detensioned during movement of the control element (9) into the first actuating position (B) and the secondary spring (33) is tensioned during movement of the control element (9) into the second actuating position (C).

9. The arrangement according to claim 7, wherein the connecting member (12) is a toothed rocker arm (12), wherein the transmission member (14) includes a pinion (14), wherein the gear teeth (13) provided on the connecting member enmesh in the pinion (14) of the transmission member (11), and/or that a second pivot lever (8) is provided, which is rotatably connected to a second bearing point and on the seat (1).

10. The arrangement according to claim 8, wherein a ratio of the pretension or bias of the primary spring (25) to the secondary spring (33) in the first actuating position (B) and/or in the second actuating position (C) of the control element (9) is in the range of 0.25 to 4.

11. The seat height adjustment module (17) according to claim 1, wherein the primary spring (25) in the second actuating position (C) is pretensioned with a maximum of 150 N.

12. The seat height adjustment module (17) according to claim 1, wherein a second connection portion (27) of the primary spring (25) is secured to more than one converter device.

13. The arrangement according to claim 8, wherein the secondary spring (33) is a torsion spring.

14. The arrangement according to claim 8, wherein a ratio of the pretension or bias of the primary spring (25) to the secondary spring (33) in the first actuating position (B) and/or in the second actuating position (C) of the control element (9) is in the range of 0.5 to 2.

15. A seat height adjustment module (17) for a seat (1), in particular for a vehicle seat (1),
with a manually operable control element (9) which is moveable out of an initial position (A) into a first actuating position (B) and into a second actuating position (C) and back and forth about an axis of rotation (23) to provide an adjusting movement for the seat (1),
with a pinion (14) having an axis of rotation coaxial with the control element axis of rotation (23), which pinion (14) is adapted to transmit the adjusting movement from the control element (9) to a connection kinematics, and
with a converter device (10), which is in cooperative association with the control element (9) and with the pinion (14) in such a way, that the pinion (14) is fixed when the control element (9) is in the initial position (A) or when the control element (9) is being returned from the first actuating position (B) or from the second actuating position (C) back into the initial position (A), and that the adjusting movement of the control element (9) is transmitted onto the pinion (14) when the control element (9) is being moved out of the initial position (A) and into the first actuating position (B) or the second actuation position (C),
wherein at least one primary spring (25) having an axis is provided, which is in cooperative association with the pinion (14) in such a that the primary spring (25) progressively relaxes during each movement of the control element (9) into the first actuating position (B) and the primary spring (25) progressively tensions during each movement of the control element (9) into the second actuating position (C), and
wherein the primary spring (25) axis is coaxial with the control element (9) axis of rotation and the pinion (14) axis of rotation.

16. The arrangement according to claim 7, wherein between the primary side and the secondary side of the arrangement a translation in the range of from 1:5 to 1:8 is provided.

17. The arrangement according to claim 7, wherein between the primary side and the secondary side of the arrangement a translation in the range of from 1:6 to 1:7 is provided.

\* \* \* \* \*